United States Patent [19]
Goldup

[11] Patent Number: 5,965,173
[45] Date of Patent: Oct. 12, 1999

[54] PLASTICATING APPARATUS AND SCREW THEREFOR

[76] Inventor: Frederick H. Goldup, 9890 D Highland, Alta Loma, Calif. 91737

[21] Appl. No.: 09/062,198

[22] Filed: Apr. 17, 1998

Related U.S. Application Data

[63] Continuation-in-part of application No. 08/783,764, Jan. 15, 1997, abandoned, which is a continuation-in-part of application No. 08/455,005, May 31, 1995, abandoned.

[51] Int. Cl.[6] .............................. B29C 47/60; B29C 47/64
[52] U.S. Cl. ...................... 425/205; 264/211.23; 366/81; 366/89; 366/322; 366/323; 425/208
[58] Field of Search ..................................... 425/205, 207, 425/208, 209; 366/81, 88, 89, 322, 323; 264/211.21, 211.23

[56] References Cited

U.S. PATENT DOCUMENTS

| | | |
|---|---|---|
| 3,788,614 | 1/1974 | Gregory . |
| 4,007,922 | 2/1977 | Tamura . |
| 4,015,832 | 4/1977 | Kruder . |
| 4,173,417 | 11/1979 | Kruder ...................................... 425/208 |
| 4,277,182 | 7/1981 | Kruder ...................................... 425/208 |
| 4,310,484 | 1/1982 | Blakeslee, III . |
| 4,896,969 | 1/1990 | Dray . |
| 5,599,097 | 2/1997 | Christie ...................................... 366/88 |

*Primary Examiner*—Harold Pyon
*Assistant Examiner*—Joseph Leyson
*Attorney, Agent, or Firm*—Walter A. Hackler

[57] ABSTRACT

Plasticating apparatus includes a barrel having an inlet for the introduction of resinous material and an outlet for the discharge of plasticated molten extrudate, along with a screw rotatably mounted within the barrel and in communication with the inlet and outlet for receiving resinous material, plasticating the resinous material, and discharging plasticated molten extrudate. The screw includes a helical flight with an outside diameter sized rotatably engaging an inside surface of the barrel and further, a helical valley disposed between flight lands of the helical flight within a transition section includes two root diameters, namely a rear root diameter and a forward root diameter, with the rear root diameter being larger than the forward root diameter proximate the inlet. In addition, a metering section is provided with special infeed and outfeed passages.

12 Claims, 3 Drawing Sheets

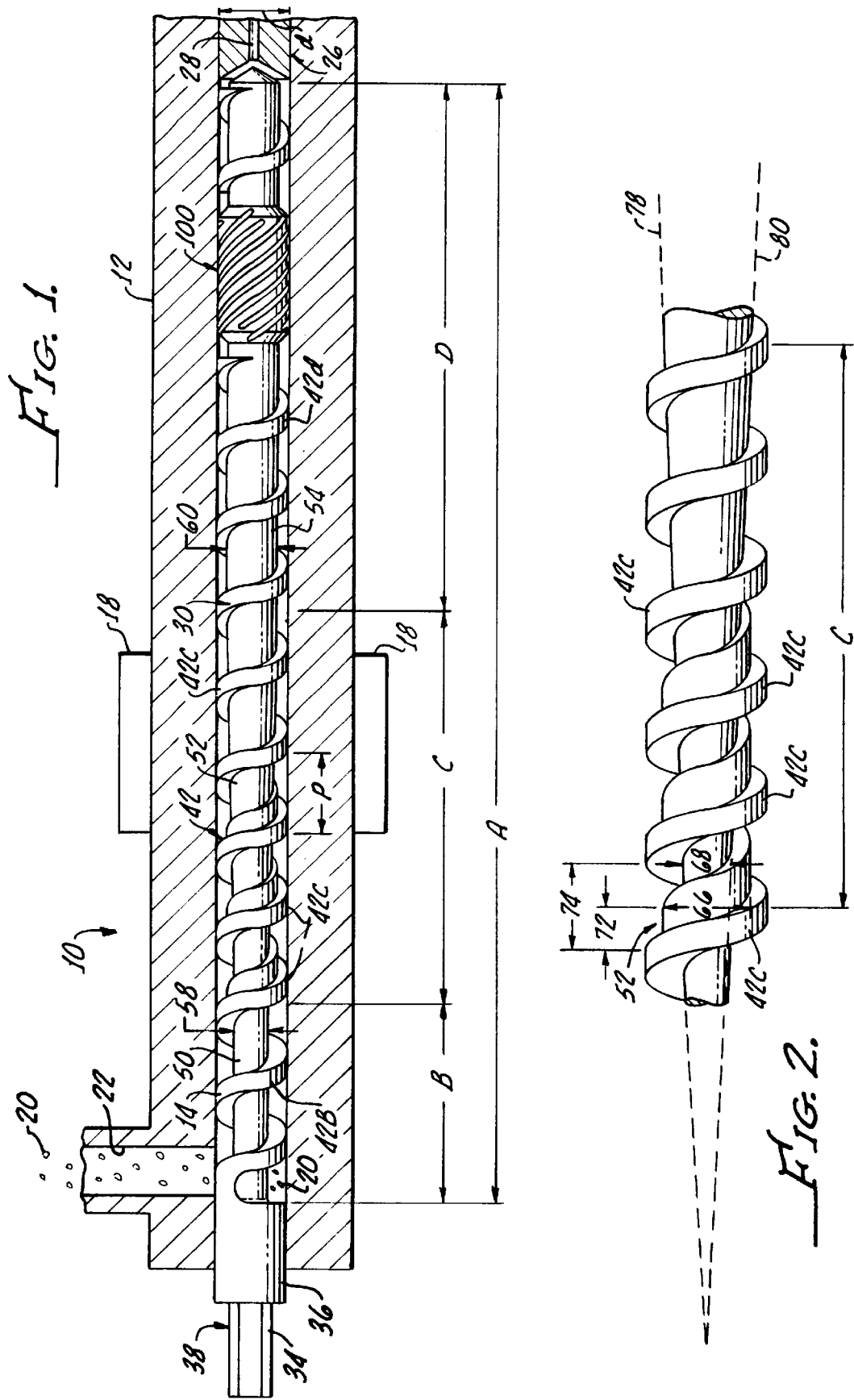

5,965,173

PLASTICATING APPARATUS AND SCREW THEREFOR

This application is a continuation-in-part of U.S. patent application Ser. No. 08/783,764, filed on Jan. 15,1997 now abandoned, which is a continuation-in-part of U.S. patent application Ser. No. 08/455,005 filed on May 31, 1995, now abandoned.

The present invention generally relates to the plasticating of resinous materials and is more particularly related to apparatus for hot extrusion of plastics which include, but are not limited to, polyethylene, high density polyethylene, linear low density polyethylene, thermoplastic rubber (TPR), polypropylene, polystyrene, nylon, Delrin®, polycarbonate, polyethylene Terephthalate (PET) and polyvinylchloride.

The most common extruding machines utilize plastic material, normally in granule pellet, granular or powder form, which is fed to a rotating screw within an elongated, cylindrical barrel which may be heated. The screw generally has three distinct sections, namely, an infeed section which conveys solid material to a compression, or transition, section and thereafter to a metering section.

The screw has one or more helical flights thereon with the flights cooperating with an inner cylindrical surface of the barrel for movement of plastic resin through the barrel from the infeed throat of the barrel onto the infeed section of the screw, through the transition or compression section, and metering section of the screw by rotating the screw inside the fixed cylindrical barrel.

In general, the infeed material introduced into a feed throat of an extruder is conveyed by the feedscrew through the infeed, transition, and metering sections of the screw. Heat is applied to the material as it is conveyed forward through the extruder by two means. First, barrel heaters apply heat from without by conventional barrel heating elements. Second, frictional or mechanical heat is simultaneously generated by movement of the material from the infeed section to the transition section of the feedscrew.

Material heating is further enhanced and intensified while progressing through the transition area of the feedscrew.

In the transition area of the feedscrew, the root diameter of the feedscrew progresses from a relatively small diameter to a large metering diameter. During the progressive increase from small to large diameter, the resin is compressed and deusified. The deusification is commonly known as the transition from bulk density to melt density of the resin material.

The resin, while progressing from the bulk to the melt density stage in the transition area of the feedscrew, undergoes heat build-up via the natural shearing of the material. The resin is also compressed simultaneously during this period of transition.

During the deusification process in the transition area of the screw, the feedscrew allows for outgassing of any air and gases which may be present back through the infeed section of the screw and expulsion of the air and gas, if any, out of the feedthroat.

The resin, having progressed through the transition area of the feedscrew and having been heated via the extruder barrel heating and shear heating aforementioned, and having reached the homogeneous melt stage, is transported to the metering section of the screw.

The metering section, being the largest root diameter of the screw, allows passage of the material uniformly in quantity and quality of homogeneous melt through the metering section of the screw and eventually from contact with the screw.

Many designs for screws have been made in an effort to improve melting, mixing, and output of various materials. For example, U.S. Pat. No. 4,310,484 to Blakeslee III, teaches pitch lengths of between 0.8 and 1.5 times a screw diameter, but this element, by itself, does not provide a significant improvement in output. U.S. Pat. No. 4,896,969 teaches different forward and rear root diameters in a transition section. U.S. Pat. No. 3,788,614 teaches a spiral cut metering section. Other references teach variations in the feed section, transition section and metering section of a screw. In fact, an infinite number of combinations have been attempted but none have resulted in any unexpected result or improvement in screw performance such as greater output or reduced operating temperatures of both the equipment and the resin temperature in order to conserve energy.

The present invention provides plasticating apparatus and screw design for enabling low resin melt temperatures, and high output rates which are obtainable at lower screw rpms than heretofore available.

SUMMARY OF THE INVENTION

A screw for plasticating of resinous material in accordance with the present invention generally includes a shank, a bearing disposed adjacent the shank, and an infeed section having a helical flight with a helical valley disposed between flight lands of the feed section helical flight.

Further, a transition section is provided having a helical flight with a helical valley disposed between the flight lands of the transition section helical flight. The transition helical valley has two root diameters, a rear root diameter and a forward root diameter. The rear root diameter is disposed in a position along the screw closer to the infeed section than the forward root diameter, and further the root diameter is larger than the forward root diameter adjacent the infeed section.

A metering section may be provided which may be spiral cut with infeed passages and outfeed passages spaced round a circumference of the meter section, each infeed and outfeed passage having a pitch length greater than a diameter of the metering section. Further, the infeed passage may include a dam at an outflow end of the metering section, and the outflow passage may include a dam at an inflow end of the metering section.

The metering section may be disposed at an end of the screw within, at most, two pitch lengths from the end. In addition, the infeed and outfeed passages may have a pitch length of twice or more a diameter of the metering section, and the metering section itself may have a length of two or more pitch lengths.

More particularly, a screw in accordance with the present invention may include a rear root diameter which extends less than one half of a pitch distance between clamps. Preferably, the rear root diameter extends about 30% of a pitch distance between transition section flight lands. Further, the rear root diameter, proximate the feed section, may be equal to a root diameter of the metering section helical valley; and the forward root diameter, proximate the feed section, may be equal to a root diameter of the feed section helical valley.

The forward root diameter may be enlarged along a traverse of the transition section from the feed section to the metering section so that the rear root diameter and the forward root diameter are equal proximate the feed section. Preferably, the forward root diameter linearly increases between the feed section and the metering section.

As it may be used in combination with a barrel having inlet means for introduction of resinous material into the barrel, outlet means for enabling discharge of plasticated molten extrudate, the present invention includes plasticating apparatus which further includes screw means, rotatably mounted within the barrel and in communication with the inlet and outlet means, for receiving the resinous material, plasticating the resinous material, and discharging plasticated resinous material through the outlet means and the plasticated molten extrudate.

Importantly, the present combination of a two root transition section and a feed section having a pitch length greater than about 1.1 times the diameter of the feed section unexpectedly enables significant reduction in melt temperature of the material being plasticated or unexpectedly increased output of material at the same temperature, than heretofore was possible. This results in a significant reduction of cycle time and less shrinkage in product despite the material utilized, which ultimately reduces product cost.

Accordingly, the present invention also encompassed an improvement to a plasticating screw in which the improvement includes a feed section having a helical flight with a helical valley disposed between flight lands of the feed section helical flight, said feed section having a pitch length greater than about 1.1 times the diameter of the feed section, and a transition section disposed between the feed section and the metering section, said transition section having a helical flight with a helical valley disposed between flight lands of the transition section helical flight, said helical valley having a rear root diameter and a forward root diameter, said rear foot diameter being closer to said feed section than the forward root diameter and the rear root diameter being greater than the forward root diameter proximate the feed section, said screw means comprising a pitch length greater than about 1.1 times the outside diameter throughout the feed and transition sections.

BRIEF DESCRIPTION OF THE DRAWINGS

The advantages and features of the present invention will be better understood by the following description when considered in conjunction with the accompanying drawings in which:

FIG. 1 is a drawing, partially in cross section, of plasticating apparatus in accordance with the present invention, generally showing a heated barrel with a screw rotatably mounted therein with an inlet for receiving resinous material and an outlet for discharging plasticated molten extrudate, the screw having an infeed section, a transition section and a metering section, the metering section being disposed in a spaced apart relationship with the outlet;

FIG. 2 is an enlarged view of a transition section of the screw shown in FIG. 1 more clearly showing forward and rear root diameters and the change therein along the transition section;

DETAILED DESCRIPTION

Figures 3, 4:
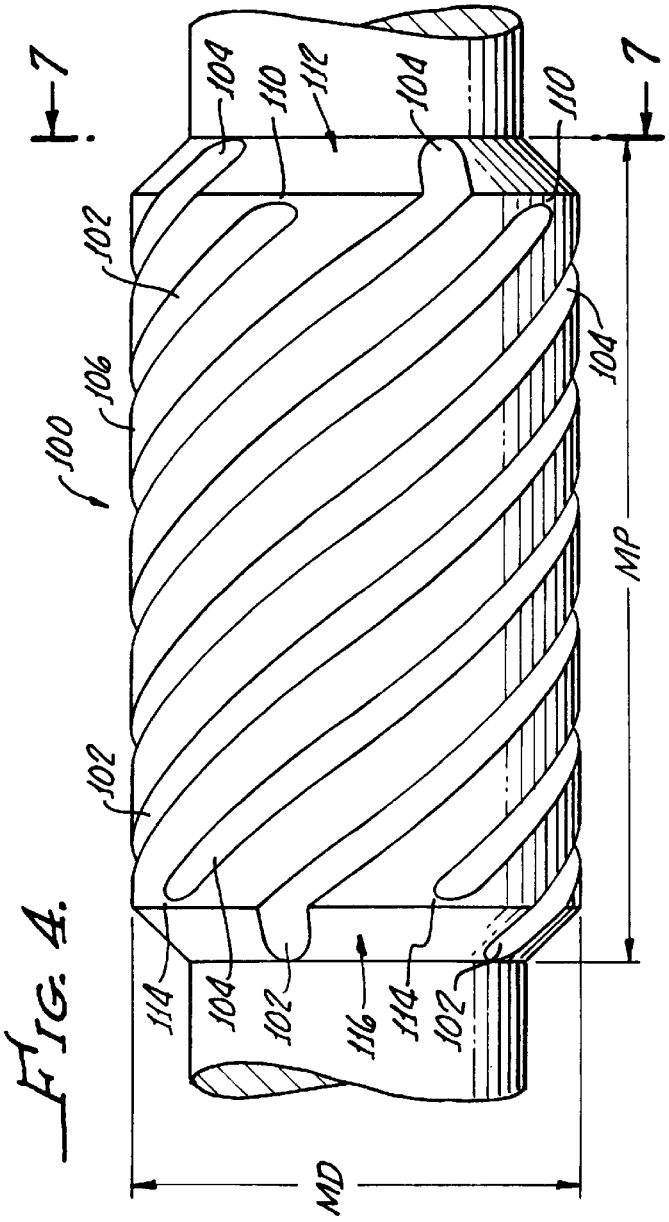
FIG. 3 is an alternative embodiment of the present invention showing a metering section adjacent the outlet.
FIG. 4 is an enlarged view of the metering section, in accordance with the present invention, showing infeed and outfeed passages.

Turning now to FIG. 1, there is shown plasticating apparatus 10 in accordance with the present invention, generally including a cylindrical barrel 12 having a cylindrical inner surface 14. Any suitable heating elements 18 may be disposed along the barrel at various positions, as is well known in the art for augmenting, and/or controlling, the heating of the barrel. Resinous material 20 provided to a hopper or aperture 22 in the barrel 12, provides a means for introducing the resinous material 20 into the barrel 12. An outlet 26 having an aperture 28 therein provides means for enabling discharge of plasticated molten extrudate, not shown.

Rotatably mounted within the barrel 12 is a screw 30 which provides means for receiving the resinous material 22, plasticating the resinous material 22 and discharging plasticated resinous material through the outlet aperture 28 as a plasticated molten extrudate, not shown. A shank 34 enables rotation of the screw 30 within the barrel 12 by any conventional drive system, not shown, and a bearing portion 36 stabilizes a drive end 38 of the screw 30 within the barrel 12.

The screw 30, having a flight length A, may be divided into three sections, namely, an infeed section B, a transition section C, and a metering section D, as indicated in FIG. 1.

A helical flight 42 extends throughout the infeed section B and transition section C, the flight being indicated as 42B in the infeed section and 42C in the transition section. The helical flight 42 has a diameter equal to the bearing diameter which may be several inches, and is sized for rotatably engaging the inside surface 14 of the barrel 12. A typical flight length A for the screw, in accordance with the present invention, may be approximately 120 inches, and a pitch length (p) may be greater than 1.1 times an outside diameter (d) of the screw 30 (see FIG. 1).

Within the feed section B, the helical valley 50 is defined between flight lands 42B. Similarly, a helical valley 52 is defined between the flight lands 42C in the transition section C, and the helical valley 54 is defined and disposed between the lands 42D within the metering section D.

As shown in FIG. 1, the helical valley 50 within the feed section may have a root diameter 58 and the helical valley 54 in the metering section has a root diameter 60.

Turning now to FIG. 2, which is an enlarged view of the transition section C, it can be more clearly seen that the helical valley 52 dispose d between transition section flight lands 42 includes two root diameters 66, 68, namely, a rear root diameter 66 and a forward diameter 68. The rear root diameter 66 is on a side of the helical valley 52 closer to the infeed section B and inlet 22, while the forward root diameter 68 is closer to the metering section D and outlet 26.

This split root diameter enables the screw 30 to plasticate polyethylene at a rate of about 20%, or more, greater than existing screws (not shown) at melt temperatures of 40° F. or less than that required by existing screws not incorporating the transition section helical valley with two root diameters at equal rotation rates. Further, it has been found that significantly less wear on the barrel and screw occurs through the use of two root diameters in the transition section, as hereinafter described.

This occurs when the root diameter 66 extends a distance 72, which is less than one half of the pitch distance 74, between the transition section flight lands 42C. Preferably, the root diameter 66 extends about 30% of the pitch distance 74 between the transition section flight lands 42C.

More particularly, the rear root diameter 66 proximate the infeed section B is approximately equal to the root diameter 60 of the metering section helical valley 54 and the forward root diameter 68 proximate the infeed section B is approximately equal to the root diameter 50 of the feed section helical valley 58.

In accordance with the present invention, and as shown in FIGS. 2 and 2, the forward root diameter 68 increases in diameter through the transition section C from the infeed section B to the metering section D. Thus, the rear root diameter 66 is equal to the forward root diameter 68 proximate the metering section D.

While a variation in the increase of the forward root diameter 68 may be linear or nonlinear, it has been found that when the forward root diameter linearly increases between the infeed section B and the metering section D, as shown by the dashed lines 78, 80 in FIG. 2, the advantages of the screw 30 and apparatus 10, as hereinabove set forth, are effected.

It should be appreciated that conventional feed screw design utilizes a square pitch, i.e., a pitch equal to a diameter, not shown. The present invention provides for a more aggressive pitch, for example, a pitch length (p) may be 1.10 times the diameter (d). Preferably, the pitch is maintained throughout the feed section B, transition section C and metering section D at about 1.1. However, greater pitch may be used, for example, about 1.2. The increase in the screw pitch provides for more material to be forced forward in a faster manner than a conventional square pitch, archimedean designed screw.

Further, the increased pitch length causes an overdrive of material which increases the pressure sooner along the screw for transporting the resin from the infeed section B to the transition section C of the screw 30.

This overdrive, however, does not only apply to the infeed/transition sections B, C, but is carried throughout the working section of the screw 30 from the infeed section B through the transition section C and the metering section D. That is, the aggressive pitch is carried fully the entire length of the screw 30 where the screw flights would normally be present.

This provides a uniform and balanced pressure throughout the full length of the screw 30 which tends to centralize the rotating screw 30 in the barrel 12, thereby reducing the screw-to-barrel interface and, concomitantly reducing frictional wear.

The present design must be contrasted with prior art designs, such as U.S. Pat. No. 4,896,969 to Dray, which utilize an overdriven or an increased pitch length at the feed section only. Unfortunately, this design tends to cause surging problems which may result in backfeed into the inlet aperture 22.

In addition, the pressure imbalances created by such a multipitch screw also tends to increase the screw and barrel interface, resulting in accelerated wear of the screw and barrel.

In contrast thereto, the present invention provides for continuously overdriving the screw 30 which provides fresh material more uniformly to the infeed and transition sections. The uniformity of the feed produces uniform feed pressure to the transition and thereafter to the metering section D.

The metering section 100, in accordance with the present invention, may be disposed no more than about two pitch lengths, p, from the outlet 26, as shown in FIG. 1 and alternatively may be disposed adjacent the outlet 26, as shown in FIG. 3.

More particularly, as shown in FIG. 4, the metering section 100 is spiral cut with a plurality of infeed passages 102, and a plurality of outfeed passages 104. The infeed passages 102 and outfeed passages 104 may be equispaced around a circumference 106 of the metering section 100 with each of the infeed passages 102 and outfeed passages 104 having a pitch length mp greater than a diameter mD of the metering section 100. Preferably, the ratio of mp to mD is about 2.

In addition, the diameter mD may be about 2% less than the diameter D of the feedscrew but larger or smaller diameters mD may be utilized. The depth of the infeed passages 102 and outfeed passages 104 may be cut to the forward width diameter of the screw means proximate the metering section, but variations of the depth are also suitable.

Figure 5:
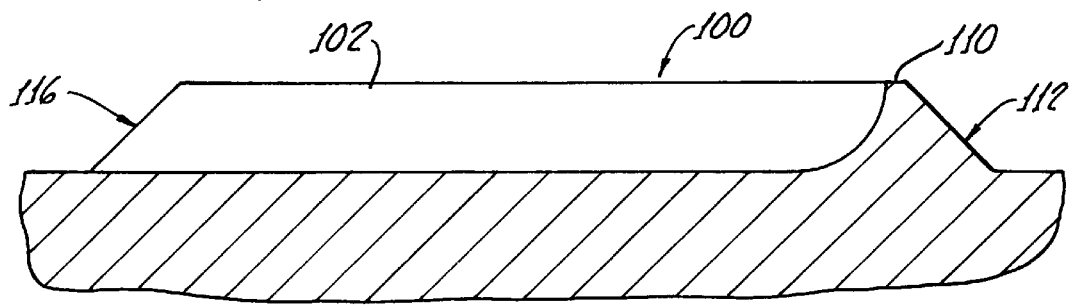
FIG. 5 is a partial cross section of the metering section shown in FIG. 4, showing a dam in an infeed passage disposed at an outflow end of the metering section.
Figure 6:
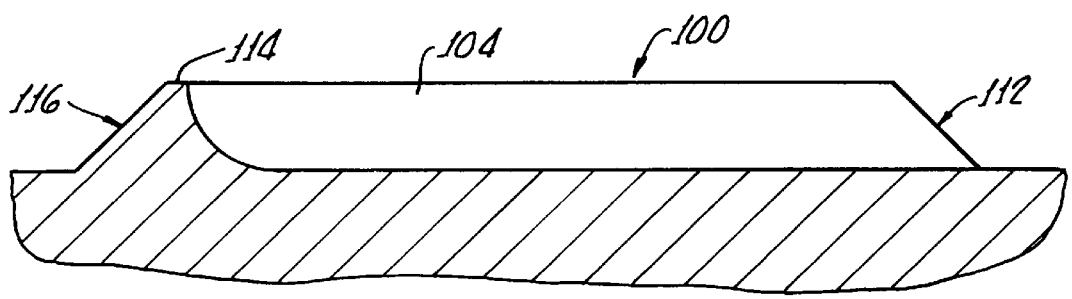
FIG. 6 is a partial cross section of the metering section shown in FIG. 4, showing a dam in an outfeed passage disposed at an inflow end of the metering section.
Figure 7:
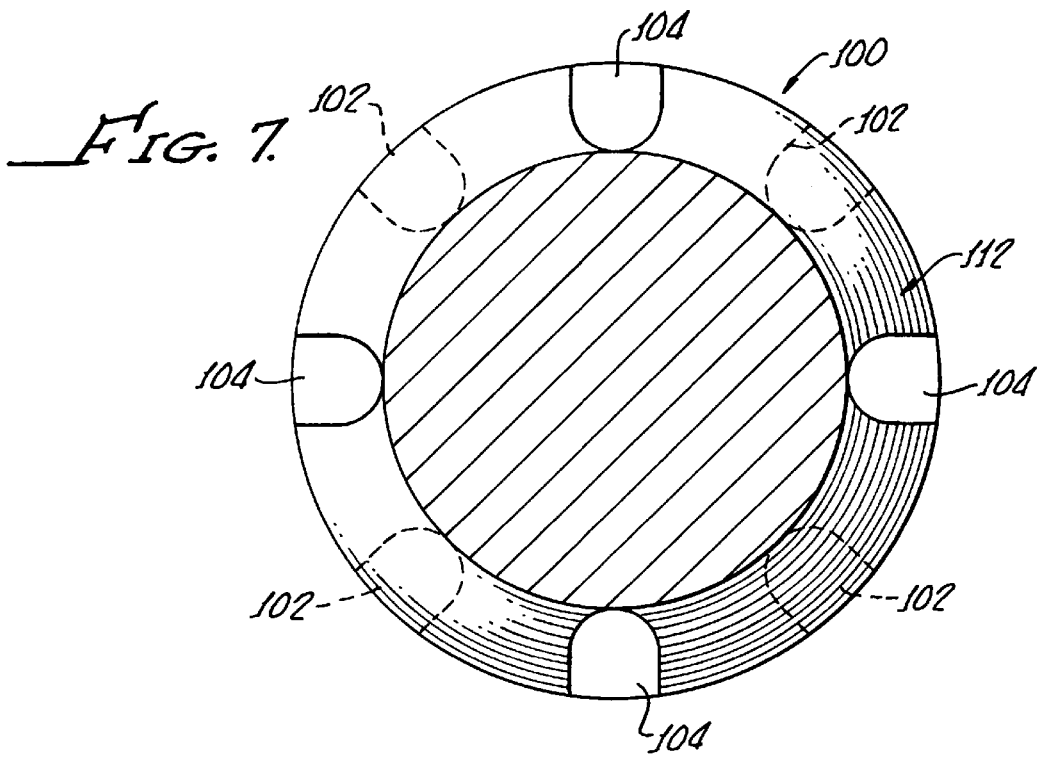
FIG. 7 is a cross sectional view of the metering section shown in FIG. 4, taken along the line 7—7.

Cross sectional views of the metering section 100 are shown in FIGS. 5, 6 and 7, with FIG. 7 being taken along the line 7—7 of FIG. 4, and showing the depth of the inlet passages 102 and outlet passages 104.

As most clearly shown in FIG. 5, the infeed passages 102 have a dam 110 at an outflow end 112 of the metering section 100 and the outflow passages 104 have a dam 114 at an inflow end 116 of the metering section 100. This arrangement controls the flow of the resin through the metering section.

The combination of the present- invention as hereinabove described now provides for up to a 40° drop in melt temperature of plasticated material. In addition, cycle times have been reduced a minimum of 10 seconds per shot of product.

When color or other additives are introduced, the percentages of these expensive concentrates have been reduced from 1% to 50% depending on the materials utilized.

In addition, the equal and opposite pressures established by the plasticating screw in accordance with the present invention reduced metal to metal contact thereby reducing the wear factor otherwise experienced in extrusion processes. This results in longer life of the screw and ultimately a lower product cost. Further, more product per revolution is accomplished which results in lower cycle time and greater product output.

Screws 12 made in accordance with the present invention can utilize square pitch with L/d ratios at about 17–20:1 rather than 24–32:1 as otherwise utilized and still provide homogeneous melts and additive dispersion. This is especially true with linear low density polyethylene which is subject to cross linking. This result is accomplished because of the lower temperature shear melting phenomenon and lower residence time provided by the present invention.

Typical results for HDPE, with a 6 melt index, in the manufacture of milk crates is shown in Table 1 which provides direct comparison of an extrusion process using a screw in accordance with the present invention (identified as NU/TWIST in Table 1), i.e., combination of transition section and metering section, and a screw without the combined transition and metering section. All other parameters of the screws, i.e. size, length, pitch, etc. are the same and each screw used in the same extruder.

TABLE 1

COMPARISON FOR MILK CRATE PRODUCTION

|  | NU/TWIST Screw | PRIOR ART Screw |
|---|---|---|
| Material | 6 Melt HDPE | 6 Melt HDPE |
| Melt temperature | 450° F. | 400° F. |
| Shot size | 3½ lbs | 3½ lbs |
| Cycle time per crate | 52 seconds | 45 seconds |
| Product stability | shrinkage occurs upon release from mold | no shrinkage |

The cost saving provided by the improved operating parameters shown in Table 1 enable the screw made in accordance with the present invention to be paid in six months time.

Other field tests have confirmed that significant reduction in melt temperature results from the use of the screw as claimed in this application with concomitant increase in throughput of material by a reduction in cycle time. Table 2 compares the present screw (identified in Table 2 as "NU/TWIST") with that of original manufactured screws (OEMS). In these comparisons the only change was the use of the present screw in lieu of the OEM screws.

TABLE 2

| SCREW | PROCESS | PRODUCT | MATERIAL | MELT TEMP (° F.) | CYCLE TIME (Sec) |
|---|---|---|---|---|---|
| OEM | Injection Blow Mldg | 32 oz Container | PET | 560 | 26 |
| NU/TWIST | Injection Blow Mldg | 32 oz Container | PET | 510 | 21.5 |
| OEM | Injection Mldg | 5 gal lid | HDPE 6 melt | 525 | 29 |
| NU/TWIST | Injection Mldg | 5 gal lid | HDPE 6 melt | 460 | 21 |
| OEM | Injection Mldg | 1 gal pail | HDPE 20 melt | 475 | 14.5 |
| NU/TWIST | Injection Mldg | 1 gal pail | HDPE 20 melt | 440 | 13.75 |
| OEM | Injection Mldg | Recycle Bin | HDPE 6 Melt | 450 | 52 |
| NU/TWIST | Injection Mldg | Recycle Bin | HDPE 6 Melt | 410 | 45 |
| OEM | Extrusion Blow Mldg | Bottle | PVC (white) | 360 | 17 |
| NU/TWIST | Extrusion Blow Mldg | Bottle | PVC (white) | 310 | 12 |
| OEM | Extrusion Blow Mldg | Quart Container | HDPE | 350 | 19 |
| NU/TWIST | Extrusion Blow Mldg | Quart Container | HDPE | 310 | 16 |

Further field tests using materials such as CELCON® (Acetal Copolymer) manufactured by Hoechst Celanese, NYLATRON® (Polyamide-Nylon 6/6) manufactured by General Polymers, KRATON® (Thermoplastic rubber) manufactured by Shell Chemical, with and without color additives have produced results similar to that shown in Table 2.

A side-by-side comparison of the screw 30 made in accordance with the present invention has been made with various prior art screws, for example, with the Blakeslee III screw described in U.S. Pat. No. 4,310,984 and the Dray screw described in U.S. Pat. No. 4,896,969 in order to demonstrate the unexpected results obtained with the applicant's screw 30. These results show that the pitch lengths of Blakeslee III of between 0.8 and 1.5 and the different forward and rear root diameter in the transition section of Dray do not separately provide outputs possible with a combination of these two structural characteristics as embodied in the screw 30.

As shown in Table 3, the NU/TWIST screw 30 when operating at the same temperature in a model FS275 NISSEI Injection Molding machine with a 64 mm bore produced 22 melt HDPE at a rate of 445 lbs/hr compared with rates of 348 lbs/hr and 360 lbs/hr for the Dray and Blakeslee screws, This amounts to an increased output of between about 24–26%.

TABLE 3

Comparison of Prior Art Screws to Screw of The Present Invention

| Material | DRAY US 4,896,969 HDPE 22 Melt | Blakeslee US 4,310,484 HDPE 22 Melt | NU/TWIST Screw 30 HDPE 22 Melt |
|---|---|---|---|
| Feed Zone | 400° F. | 400° F. | 400° |
| Transition Zone | 425° F. | 425° F. | 425° F. |
| Metering Zone | 440° F. | 440° F. | 440° F. |
| Oz./sec. | 1.55 | 1.6 | 1.98 |
| Lbs./hr. | 348 | 360 | 445 |

All the screws reported in Table 3 were of the same size and operated in the same injection molding machine. The 24–26% increase represents a truly unexpected increase in product output.

Similar results were obtained with the following materials: HDPE (1 melt–22 Melt); L.L.D.P.E. (1 Melt) H.M.D.P.E; Polycarbonate; Acrylic; Nylon; Acatel; PVC Flexible; PVC Rigid; TPR; PET and ABS.

In order to compare the combination of the feed section having a pitch length of greater than 1.1, and the transition section with a helical valley having different rear root and forward root diameters, all the screws tested were made with a feed section pitch length of 3 inches. The rear/forward root diameters were cut in accordance with the Dray specification and each screw was made with the same metering section as set forth herein.

Thus Table 3 clearly shows the unexpected results achieved through the combination of a feed section having a pitch length greater than about 1.1 times the diameter of the feed section and a transition section having different rear and forward root diameters.

Although there has been hereinabove described a plasticating apparatus along with a screw and an improvement to an existing screw in accordance with the present invention, for the purpose of illustrating the manner in which the invention may be used to advantage, it should be appreciated that the invention is not limited thereto. Accordingly, any and all modifications, variations or equivalent arrangements which may occur to those skilled in the art, should be considered to be within the scope of the present invention as defined in the appended claims.

What is claimed is:

1. In a screw for plasticating resinous material, the improvement comprising, in combination:

a feed section having a helical flight with a helical valley disposed between flight lands of the feed section helical flight, said feed section having a pitch length greater than about 1.1 times the diameter of the feed section;

a metering section; and a transition section disposed between the feed section and the metering section, said transition section having a helical flight with helical valleys disposed between flight lands of the transition section helical flight, each said transition section helical valley having a rear root diameter and a corresponding forward root diameter, each rear root diameter being closer to said feed section than the corresponding forward root diameter and each rear root diameter being greater than the corresponding forward root diameter proximate the feed section, the forward root diameters linearly increasing in diameter between the feed section and the metering section, said screw comprising a pitch length greater than about 1.1 times the outside diameter, said pitch length being constant throughout the feed metering, and transition sections.

2. A plasticating apparatus comprising:

a barrel having inlet means for the introduction of resinous material into the barrel and outlet means for enabling discharge of plasticated molten extrudate; and screw means, rotatably mounted within said barrel and having a length extending between said inlet means and said outlet means for receiving the resinous material, plasticating the resinous material and discharging plasticated resinous material through the outlet means as a plasticated molten extrudate, said screw means having an infeed section with a helical flight with an outside diameter sized for rotatably engaging an inside surface of said barrel and a helical valley disposed between flight lands of said helical flight, said screw means comprising a metering section and a transition section, between said infeed section and said metering section, said transition section having a helical flight with helical valleys disposed between flight lands of the transition section helical flight, each valley having a rear root diameter and a corresponding forward root diameter, each rear root diameter being closer to said inlet means than the corresponding forward root diameter and each rear root diameter being greater than the corresponding forward root diameter proximate the inlet means, the forward root diameters linearly increasing in diameter between the infeed section and the metering section, said screw means comprising a pitch length greater than about 1.1 times the outside diameter throughout the infeed transition and metering sections, the pitch length being constant.

3. A screw for plasticating of resinous material, said screw comprising:

a shank;

a feed section having a helical flight with a helical valley disposed between flight lands of the feed section helical flight, said feed section having a pitch length greater than about 1.1 times the diameter of the feed section;

a metering section; and a transition section disposed between the feed section and the metering section, said transition section having a helical flight with helical valleys disposed between flight lands of the transition section helical flight, each transition section helcial valley having a rear root diameter and a corresponding forward root diameter, each rear root diameter being closer to said feed section than the corresponding forward root diameter and each rear root diameter being greater than the corresponding forward root diameter proximate the feed section, the forward root diameters linearly increasing in diameter between the feed section and the metering section, said screw means comprising a pitch length greater than about 1.1 times the outside diameter throughout the feed, metering and transition sections, said pitch length being constant.

4. The screw according to claim 3 wherein said metering section is spiral cut having infeed passages and outfeed passages spaced around a circumference of the metering section, each infeed and outfeed passage having a pitch length greater than a diameter of the metering section, said infeed passage having a dam at an outflow end of the metering section, and said outflow passage having a dam at an inflow end of the metering section.

5. The screw according to claim 4 wherein said metering section is disposed no more than about two transition section pitch lengths from one end of the screw.

6. The screw according to claim 4 wherein said metering section is disposed adjacent one end of the screw.

7. The screw according to claim 4 wherein the infeed and outfeed passages have a pitch length of about twice a diameter of the metering section.

8. The screw according to claim 4 wherein the infeed and outfeed passages have a bottom diameter approximately equal to a root diameter of the transition section proximate the metering section.

9. The screw according to claim 3 wherein the rear root diameter extends less than one half of a pitch distance between the transition section flight lands.

10. The screw according to claim 3 wherein the rear root diameter extends about 30% of a pitch distance between the transition section flight lands.

11. The screw according to claim 3 wherein the rear root diameter, proximate the feed section, is equal to a rear root diameter of the metering section helcial valley and the forward diameter, proximate the feed section, is equal to a rear root diameter of the feed section helical valley.

12. The screw according to claim 11 wherein the rear root diameter and the forward root diameter are equal proximate the metering section.

* * * * *